(12) United States Patent
Kuehnel et al.

(10) Patent No.: US 9,464,602 B2
(45) Date of Patent: Oct. 11, 2016

(54) EXHAUST FLAP DEVICE FOR AN INTERNAL COMBUSTION ENGINE

(71) Applicant: PIERBURG GMBH, Neuss (DE)

(72) Inventors: Hans-Ulrich Kuehnel, Moenchengladbach (DE); Peter Corbach, Bochum (DE); Elina Sovva, Duesseldorf (DE)

(73) Assignee: PIERBURG GMBH, Neuss (DE)

( * ) Notice: Subject to any disclaimer, the term of this patent is extended or adjusted under 35 U.S.C. 154(b) by 0 days.

(21) Appl. No.: 14/395,064

(22) PCT Filed: Mar. 15, 2013

(86) PCT No.: PCT/EP2013/055422
§ 371 (c)(1),
(2) Date: Oct. 17, 2014

(87) PCT Pub. No.: WO2013/156221
PCT Pub. Date: Oct. 24, 2013

(65) Prior Publication Data
US 2015/0101321 A1    Apr. 16, 2015

(30) Foreign Application Priority Data

Apr. 18, 2012 (DE) .......................... 10 2012 103 374

(51) Int. Cl.
| | | |
|---|---|---|
| F01N 3/02 | (2006.01) | |
| F01N 3/04 | (2006.01) | |
| F01N 13/08 | (2010.01) | |

(52) U.S. Cl.
CPC .............. *F02M 26/70* (2016.02); *F01N 3/043* (2013.01); *F01N 13/08* (2013.01); *F02M 26/02* (2016.02); *F01N 2240/36* (2013.01); *F01N 2260/024* (2013.01); *F01N 2260/14* (2013.01); *F01N 2390/02* (2013.01); *Y02T 10/20* (2013.01)

(58) Field of Classification Search
USPC .......... 60/274, 278, 287, 292, 298, 320, 324
See application file for complete search history.

(56) References Cited

U.S. PATENT DOCUMENTS

| | | | |
|---|---|---|---|
| 6,213,105 B1 | 4/2001 | Banzhaf et al. | |
| 6,976,480 B2 * | 12/2005 | Miyoshi et al. ......... | 123/568.12 |
| 7,168,419 B2 * | 1/2007 | Rosin et al. ............. | 123/568.12 |
| 8,225,773 B2 * | 7/2012 | Gruner et al. ........... | 123/568.12 |
| 8,230,681 B2 * | 7/2012 | Kobayashi et al. ............ | 60/324 |

(Continued)

FOREIGN PATENT DOCUMENTS

| | | |
|---|---|---|
| CN | 202091059 U | 12/2011 |
| DE | 197 50 588 A1 | 5/1999 |
| DE | 101 14 221 A1 | 10/2002 |
| DE | 602 08 832 T2 | 8/2006 |
| DE | 10 2006 034 176 A1 | 11/2007 |
| DE | 10 2006 043 559 A1 | 3/2008 |
| DE | 10 2006 054 041 B3 | 5/2008 |
| EP | 1 420 158 A2 | 5/2004 |
| EP | 2 378 092 A2 | 10/2011 |
| WO | WO 2010/123899 A1 | 10/2010 |
| WO | WO 2011/106216 A1 | 9/2011 |

*Primary Examiner* — Binh Q Tran
(74) *Attorney, Agent, or Firm* — Norman B. Thot

(57) ABSTRACT

An exhaust flap device for an internal combustion engine includes a flap housing and an actuator. The flap housing comprises an exhaust gas duct arranged in the flap housing. The exhaust gas duct is configured to have an exhaust gas flow there-through. An exhaust flap is arranged in the exhaust gas duct and is mounted in the flap housing. The exhaust flap is configured to rotate. A coolant duct is arranged in the flap housing so as to at least partially surround the exhaust flap. The actuator comprises an electric motor and an actuator housing which comprises an actuator coolant duct. The actuator is configured to drive the exhaust flap. The coolant duct arranged in the flap housing is configured to be in a direct fluid communication with the actuator coolant duct.

12 Claims, 3 Drawing Sheets

(56) References Cited

U.S. PATENT DOCUMENTS

| | | | |
|---|---|---|---|
| 8,443,593 B2 * | 5/2013 | Sloss et al. | 60/320 |
| 8,522,537 B2 * | 9/2013 | Lee et al. | 60/320 |
| 8,584,709 B2 * | 11/2013 | Albert | 137/875 |
| 8,695,332 B2 * | 4/2014 | Smith et al. | 60/320 |
| 9,267,466 B2 * | 2/2016 | Kuehnel | F02M 25/0735 |
| 2002/0152988 A1 | 10/2002 | Michels | |
| 2009/0217668 A1 | 9/2009 | Venghaus et al. | |

\* cited by examiner

EXHAUST FLAP DEVICE FOR AN INTERNAL COMBUSTION ENGINE

CROSS REFERENCE TO PRIOR APPLICATIONS

This application is a U.S. National Phase application under 35 U.S.C. §371 of International Application No. PCT/EP2013/055422, filed on Mar. 15, 2013 and which claims benefit to German Patent Application No. 10 2012 103 374.9, filed on Apr. 18, 2012. The International Application was published in German on Oct. 24, 2013 as WO 2013/156221 A1 under PCT Article 21(2).

FIELD

The present invention relates to an exhaust flap device for an internal combustion engine, comprising a flap housing, in which a duct through which exhaust gas flows is formed, an exhaust flap, which is arranged rotatably in the exhaust duct and is supported in the flap housing, an actuator having an actuator housing and an electric motor, by means of which the exhaust flap can be driven, and a coolant duct, which is formed in the flap housing and at least partially surrounds the exhaust flap.

BACKGROUND

Such exhaust flap devices can be used in the field of exhaust gas recirculation, heat recovery, or as exhaust brakes for the increase of differential pressure. High demands are posed on these exhaust flap devices to provide functional reliability due to the high temperatures. In this regard, both the flap body itself with its bearing and the actuator for driving the flap must be designed for this thermal stress. For this reason, use is often made either of temperature-insensitive actuators, such as vacuum actuators, for driving such flaps, or the actuator is arranged at a sufficient distance from the hot exhaust gas. Bearings with high thermal load capacities, such as, for example, ceramic bearings are additionally used to support the flap shaft.

The use of low-cost materials and of electromotively driven actuators is made possible by the fact that the flap housing is cooled and the actuator is thermally separated from the flap housing.

DE 602 08 832 T2 describes an exhaust gas recirculation device in which a flap body for controlling the exhaust gas flow is arranged upstream of a heat exchanger. The housing of the exhaust flap is provided with a coolant jacket which is in fluid communication with the coolant jacket of the heat exchanger via a coolant. The actuator of the flap is fastened on the outside of the housing and is thermally separated from the exhaust gas duct by means of the coolant jacket.

An exhaust gas recirculation device with a double flap is also described in DE 10 2006 054 041 B3 which is driven by an electric motor that is surrounded by a spiral-shaped coolant duct. No cooling of the flaps is provided.

EP 1 420 158 A2 describes an exhaust gas recirculation device in which an electric motor and a flap driven by the electric motor are arranged in a common housing. The flap is surrounded by a coolant duct, wherein one of the cooling ducts is arranged between the flap and the electric motor.

The cooling of these known devices is, however, often insufficient so that excessive thermal stress on the bearings, the electric motor, or the electronics of the electric motor occurs. Eddy water areas with insufficient flow are further not avoided, which also reduces the cooling effect.

SUMMARY

An aspect of the present invention is to provide an exhaust flap device which provides for a good cooling of the flap, the bearings and the actuator. The assembly effort should thereby be as low as possible, with additional conduits being avoided.

In an embodiment, the present invention provides an exhaust flap device for an internal combustion engine which includes a flap housing and an actuator. The flap housing comprises an exhaust gas duct arranged in the flap housing. The exhaust gas duct is configured to have an exhaust gas flow there-through. An exhaust flap is arranged in the exhaust gas duct and is mounted in the flap housing. The exhaust flap is configured to rotate. A coolant duct is arranged in the flap housing so as to at least partially surround the exhaust flap. The actuator comprises an electric motor and an actuator housing which comprises an actuator coolant duct. The actuator is configured to drive the exhaust flap. The coolant duct arranged in the flap housing is configured to be in a direct fluid communication with the actuator coolant duct.

BRIEF DESCRIPTION OF THE DRAWINGS

The present invention is described in greater detail below on the basis of embodiments and of the drawings in which.

DETAILED DESCRIPTION

Figure 1:
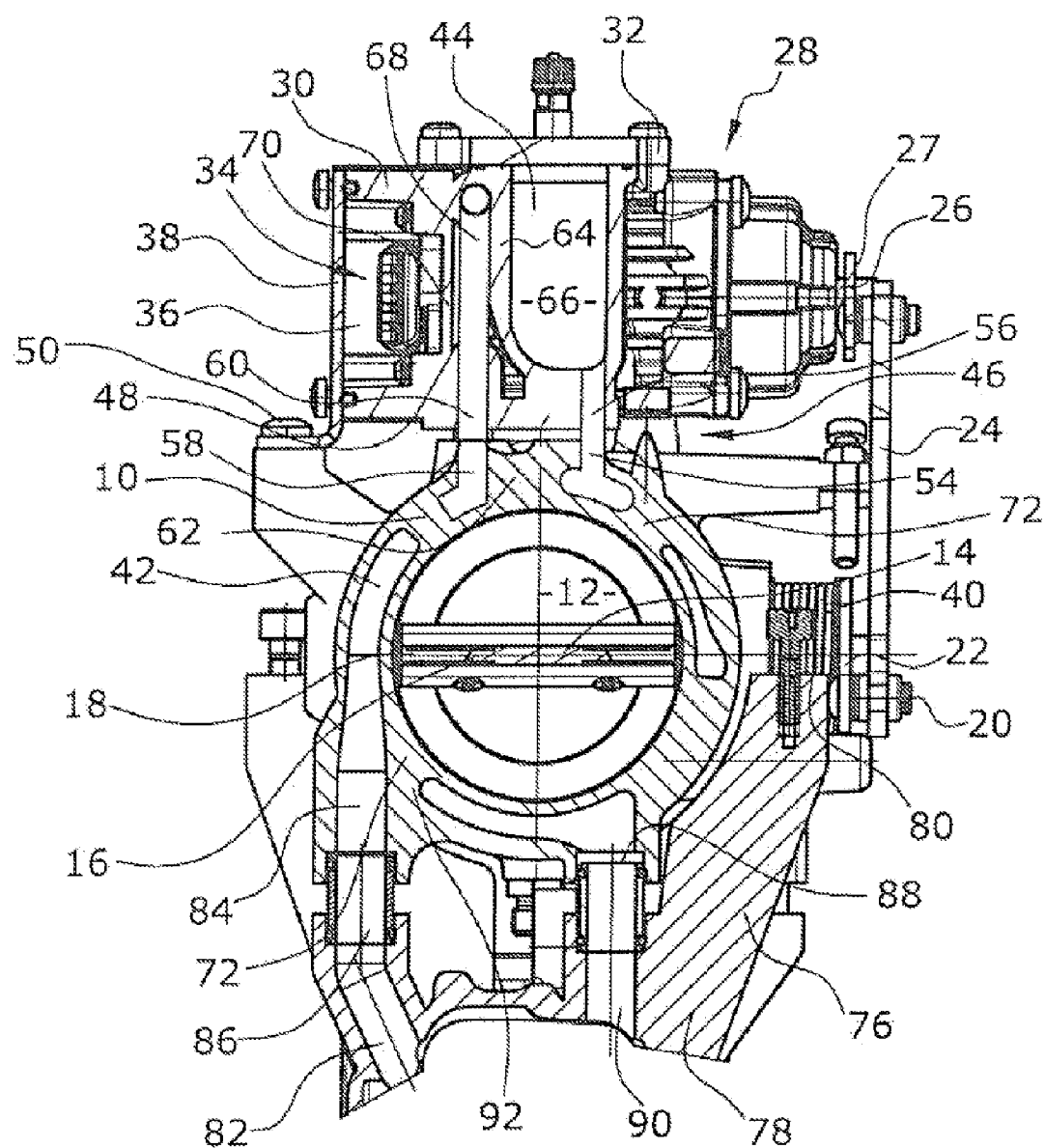
FIG. 1 shows a sectional front view of an exhaust flap device of the present invention.
Figure 2:
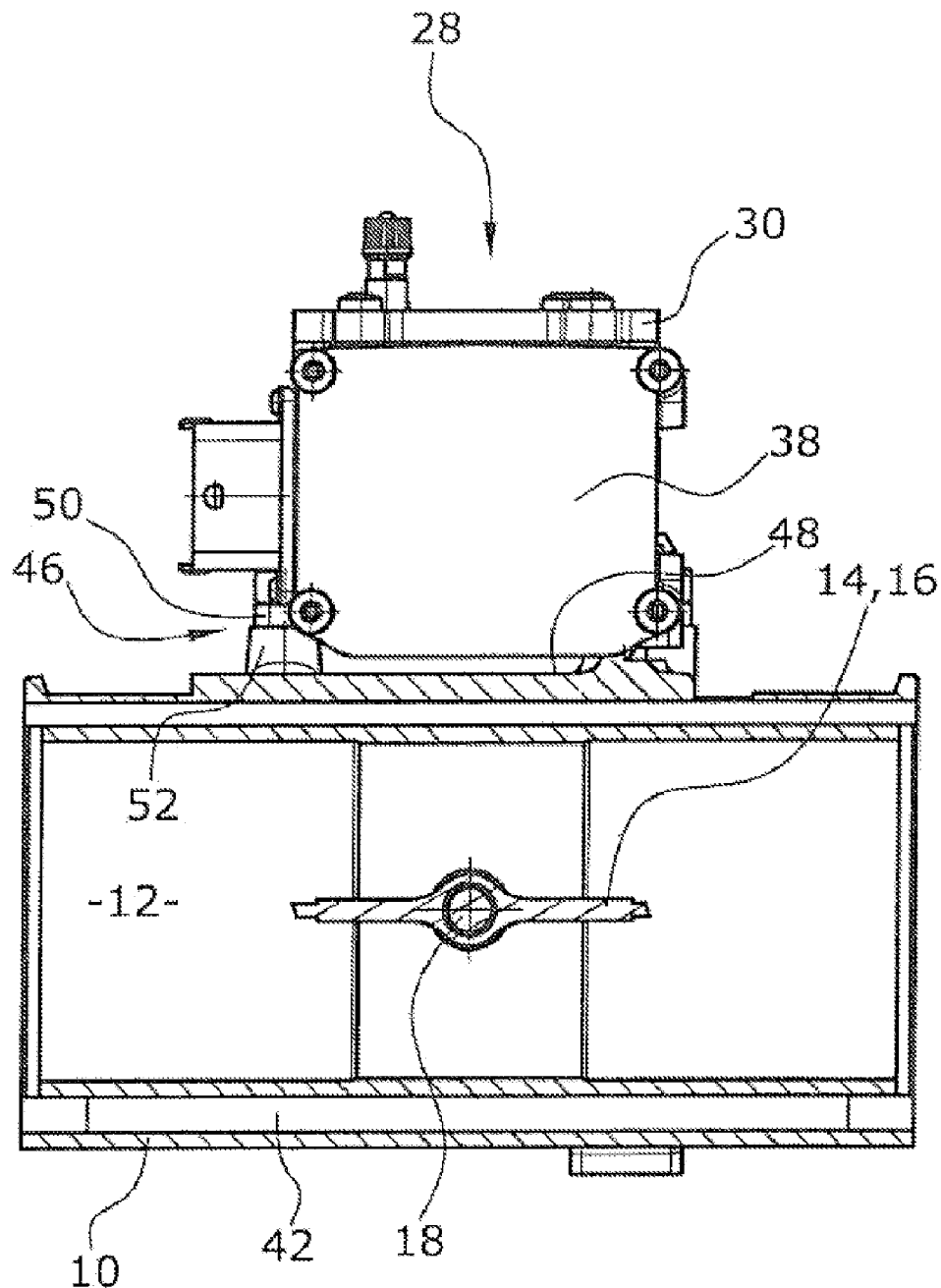
FIG. 2 shows a detail of a sectional side elevational view of the exhaust gas flap of the present invention shown in FIG. 1.

Because the coolant duct in the flap housing is in immediate fluid communication with a coolant duct in the actuator housing, a closed coolant circuit is formed, whereby it is possible to not only cool the flaps and the bearings in the flap housing, but to also directly cool the electric motor and the control unit of the actuator. Due to the immediate connection, this is effected without additional conduits so that the assembly effort is minimized.

In an embodiment of the present invention, a coolant inlet of the actuator housing can, for example, be connected with a first coolant outlet of the flap housing, and a first coolant inlet of the flap housing can, for example, be connected with a coolant outlet of the actuator housing. A flow is accordingly formed that flows from the flap housing to the actuator housing and back to the flap housing. No connecting conduits or inlet and outlet nozzles therefore need be fastened on the actuator housing.

In an embodiment of the present invention, the actuator housing can, for example, be fastened to the flap housing via a flange connection so that the fastening of the flange not only realizes the mechanical fastening of the actuator on the exhaust flap housing, but at the same time establishes a fluid communication between the two coolant ducts.

In an embodiment of the present invention, a partition wall can, for example, be arranged between the first coolant inlet and the first coolant outlet of the flap housing. Depending on the arrangement of the coolant inlets and outlets, i.e., depending on whether the coolant inlet of the flap housing is arranged axially or circumferentially offset with respect to the coolant outlet, the partition wall extends either in the axial or the circumferential direction. A flow into the actuator housing is provided in this manner since a short-circuit flow from the inlet to the outlet of the flap housing is prevented.

In an embodiment of the present invention, the coolant duct in the flap housing can, for example, comprise flow guiding walls for a force guiding of the coolant. These walls are arranged so that, possibly, a duct with a uniform flow resistance is formed which surrounds the entire flap and must be flowed through completely from the inlet into the flap housing to the outlet and via the actuator housing.

In an embodiment of the present invention, the flow guiding walls can, for example, be correspondingly arranged relative to each other in the axial direction of the flap housing so that the coolant flow is force guided in changing directions parallel to the duct axis along the circumference of the flap housing. This can be realized, for example, by making the respective axially extending partition walls alternately shorter on the opposite sides, as seen along the circumference, along the axial length of the flap housing, so that at these positions, the coolant can flow over into the adjacent duct. The continuous partition walls are closed by means of a housing part attached thereto. A complete force guided flow is thus realized in a simple manner.

In an embodiment of the present invention, the coolant duct in the actuator housing can, for example, extend along a rear wall of the electronic control unit so as to at least partially surround the electric motor, whereby a sufficient active cooling of both the windings and the power transistor of the control circuit is provided. Excessive stress on these components is thereby largely excluded.

It can be advantageous if the coolant duct extends spirally in the flap housing since this causes an approximately uniform cooling of the housing over the circumference.

In an embodiment of the present invention, the coolant duct in the flap housing can, for example, be in direct fluid communication with a coolant duct formed in a heat exchanger housing so that a structural unit formed by the heat exchanger, the flap, and the actuator is obtained which is structured without any additional connecting conduits and which comprises a common coolant circuit. A single coolant inlet nozzle and a single coolant outlet nozzle are thereby sufficient to form a coolant flow through all three aggregates.

Correspondingly, a second coolant inlet of the flap housing is connected with a coolant outlet of the heat exchanger housing, and a coolant inlet of the heat exchanger housing is connected with a second coolant outlet of the flap housing. A coolant flow is thus generated from the heat exchanger to the actuator housing via the flap housing and back without having to use exterior conduits.

A simple assembly is achieved if the flap housing is fastened on the heat exchanger housing through a flange connection so that the realization of the mechanical connection of the housings also serves to fluidically connect the ducts.

A partition wall is also formed in this case between the second coolant inlet of the flap housing and the second coolant outlet of the flap housing for safe prevention of a short-circuit flow. A sufficient flow through the flap housing is correspondingly provided.

An exhaust flap device is thus provided which has a long service life since a continuous withdrawal of heat is made possible by providing a coolant flow in the flap housing and in the actuator housing. The necessary assembly effort is thereby kept low so that additional costs are avoided. As an alternative, more economic materials can be used since a sufficient cooling without any additional interfaces is provided.

An embodiment of an exhaust flap device of the present invention is illustrated in the drawings and will be described hereunder.

The exhaust flap device illustrated in the drawings comprises a flap housing 10 which radially defines a duct 12 through which exhaust gas flows, an exhaust flap 14 being arranged in this duct. The exhaust flap 14 is formed by a flap body 16 as well as a shaft 18 on which the flap body 16 is fastened. The shaft 18 is rotatably supported in the flap housing 10 on two opposite sides of the exhaust gas duct 12.

The shaft 18 protrudes from the flap housing 10 on one side. The end of the shaft 18 is mounted with an eccentric 22 whose second axis 20 has a lever 24 rotatably mounted thereon, while the opposite end of the lever 24 is rotatably fastened to a second eccentric 26 whose rotational axis is formed by a drive shaft 27 of an actuator 28.

The actuator 28 comprises an electric motor 32 arranged in an actuator housing 30, which electric motor 32 is controlled via an electronic control unit 34 arranged in a chamber 36 in the actuator housing 30, which is closed by a cover 38.

When the electric motor 32 is suitably controlled by the control unit 34, the flap body 16 can be rotated by the mechanical coupling via the eccentrics 22, 26 and the lever 24, as well as the shaft 18, in order to control the flow cross section and thus the exhaust gas flow in the exhaust duct 12. In the event of a failure of the control unit 34, the electric motor 32, or the transmission linkage (22, 24, 26), a return spring 40 biased in the opening direction of the exhaust flap 14 is wound around the shaft 18, so that in case of a failure of one of the aggregates, the spring force turns the exhaust flap 14 into its emergency position in which it opens the cross section.

For a reliably prevention of an overheating of the bearings, the electric motor 32 and the electronic control unit 34, the present invention provides that the flap housing 10 is formed with coolant ducts 42 and the actuator housing 30 is formed with coolant ducts 44, which are in immediate fluid communication, i.e., in the present embodiment, via a flange connection 46.

By connecting the flange plate 48 of the actuator housing 30 by means of screws 50 to posts 52 with internal threads correspondingly formed on the flap housing 10, a first coolant outlet 54 of the coolant duct 42 of the flap housing 10 is at the same time fluidically connected with a coolant inlet 56 of the coolant duct 44 of the actuator housing 30, and a first coolant inlet 58 of the coolant duct 42 of the flap housing 10 is fluidically connected with a coolant outlet 60 of the coolants duct 44 of the actuator housing 30, so that the coolant flowing in the coolant duct 42 flows into the coolant duct 44 via the coolant inlet 56 and, from there, back into the coolant duct 42 via the first coolant inlet 58. This flange connection 46 is effected in particular with interposition of correspondingly configured seals (not illustrated) which surround the first coolant inlet 54 and the first coolant outlet 58.

This flow of coolant is provided by arranging a partition wall 62 between the first coolant inlet 58 and the first coolant outlet 54 of the coolant duct 42 in the flap housing 10, which wall prevents a short-circuit flow from the coolant outlet 54 directly to the coolant inlet 58.

The coolant duct 44 in the actuator housing 30 also has a partition wall 64 between the coolant inlet 56 and the coolant outlet 60. Not only is the partition wall 64 formed in the actuator housing 30, but, in addition, a force guided flow is provided overall by the fact that the coolant duct 44 in the actuator housing 30 is formed at least by a first duct section 66 into which the coolant flows from the coolant inlet 56 and which surrounds the electric motor 32 at least sectionally, and by a second duct section 68 into which the coolant flows from the first duct section 66 and from which the coolant thereafter flows to the coolant outlet 60. This second duct section 68 passes along a rear wall 70 of the control unit 34 so that the same is also cooled actively.

The coolant duct 42 in the flap housing 10 is also designed so that eddy water areas are prevented by means of force guiding effected by flow guiding walls 72. These flow guiding walls 72 extend in parallel to the duct axis and are distributed over the circumference of the exhaust duct 12 so that an approximately constant flow resistance and thus pressure loss exists. In order to form a closed coolant duct 42, the flow guiding walls 72 alternately extend, as seen in the circumferential direction, to the end of the flap housing 10 or end at a distance from the axial end thereof. The coolant duct 42 is therefore closed axially when the flap housing 10 is mounted to further pipe housings by means of flanges. A deflection of the coolant flow into the adjacent coolant duct is here possible anywhere the flow guiding wall 72 ends axially before the end of the flap housing 10. A flow with a changing axial flow direction is thus obtained that continues along the circumference.

Figure 3:
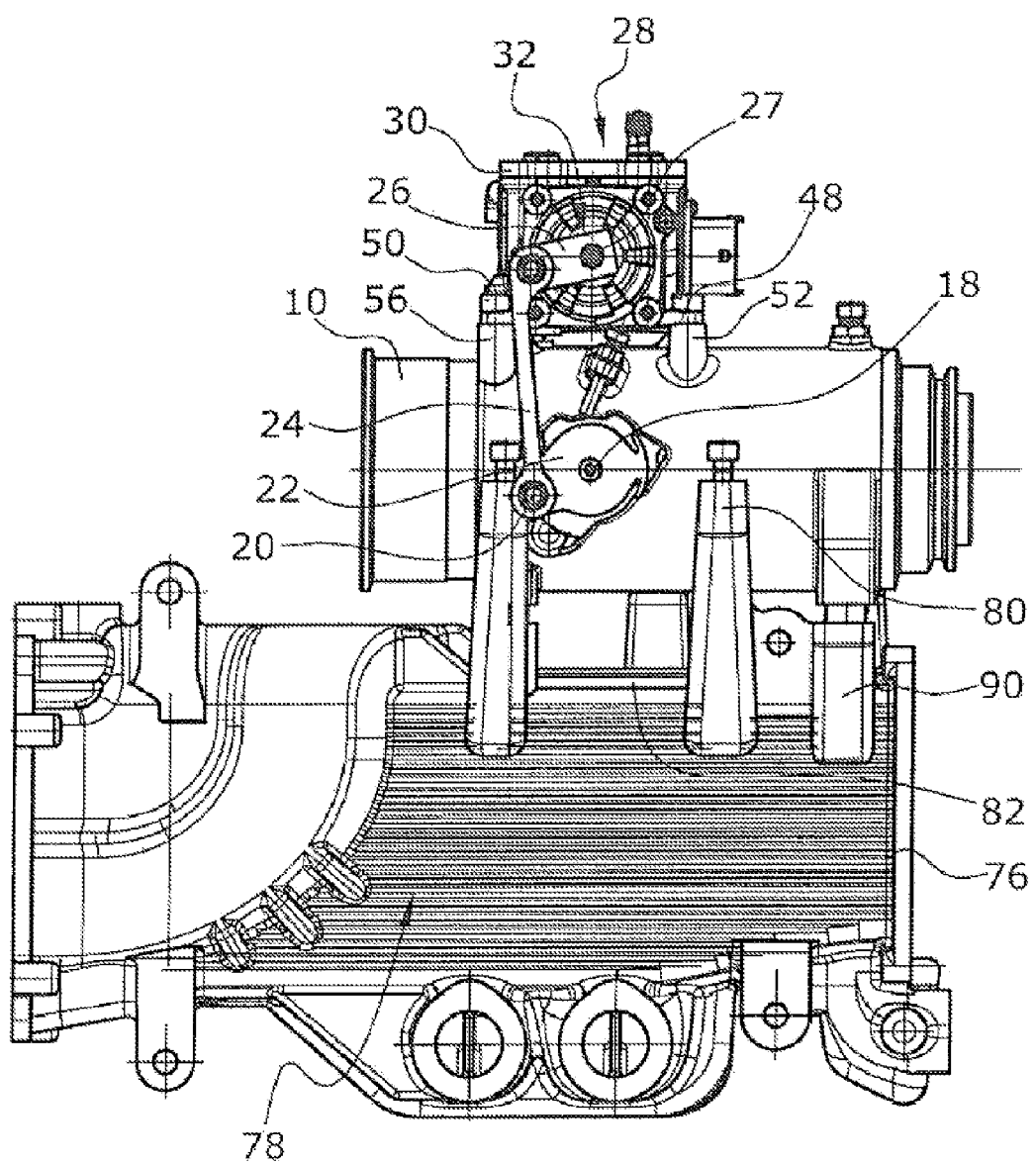
FIG. 3 shows a side view of the exhaust flap device of the present invention of FIG. 1, shown in top plan view.

FIG. 3 shows that such a flap housing 10 is connected directly with a heat exchanger housing 76 of a heat exchanger 78 used as an exhaust gas cooler. This fastening is also in the form of a flange connection 80 by which a fluid communication of a coolant duct 82 of the heat exchanger 78 with the coolant duct 42 of the flap housing 10 is established. For this purpose, the flap housing 10 has a second coolant inlet 84 that is connected with a coolant outlet 86 of the heat exchanger housing 76, and a second coolant outlet 88 that is connected with a coolant inlet 90 of the heat exchanger housing 76. If necessary, non-illustrated seals are of course provided between the heat exchanger housing 76 and the flap housing 10, which seals surround the second coolant inlet 84 and the second coolant outlet 88. In this embodiment, a partition wall 92 is likewise formed between the second coolant inlet 84 and the second coolant outlet 88, as illustrated in FIG. 1.

These exhaust flap devices of the present invention are correspondingly cooled actively in a continuous manner both in the area where the thermal stress is generated and in the areas to be protected against excessive thermal stress, i.e., the bearings, the electric motor and the electronics. This active cooling is effected through the cooling system of the internal combustion engine so that additional connecting conduits and pipe connections can be omitted. Owing to the existing forced guiding of the coolant through all aggregates, thermal peaks caused by eddy water areas are avoided. The heat is thus discharged continuously so that the service life is extended.

It should be understood that the scope of protection of the present main claim is not limited to the embodiments described. Specifically, for example, the coupling of the actuator with the flap can be realized in a different way, e.g., by a gearing. The coolant inlets and outlets could also be arranged differently relative to each other, such as radially instead of axially. The partition walls would in this case also extend differently in the coolant duct in order to avoid a short-circuit flow. A different forced flow guiding is surely also conceivable. Reference should be had to the appended claims.

What is claimed is:

1. An exhaust flap device for an internal combustion engine, the exhaust flap device comprising:
    a flap housing comprising:
        an exhaust gas duct arranged in the flap housing, the exhaust gas duct being configured to have an exhaust gas flow there-through,
        an exhaust flap arranged in the exhaust gas duct and mounted in the flap housing, the exhaust flap being configured to rotate, and
        a coolant duct arranged in the flap housing so as to at least partially surround the exhaust flap; and
    an actuator comprising an electric motor and an actuator housing which comprises an actuator coolant duct, the actuator being configured to drive the exhaust flap,
    wherein,
    the coolant duct arranged in the flap housing is configured to be in a direct fluid communication with the actuator coolant duct, and
    the flap housing and the actuator housing are provided separately.

2. The exhaust flap device as recited in claim 1, wherein, the flap housing further comprises a first coolant inlet and a first coolant outlet,
    the actuator housing further comprises a coolant inlet and a coolant outlet,
    the coolant inlet of the actuator housing is connected with the first coolant outlet of the flap housing, and
    the first coolant inlet of the flap housing is connected with the coolant outlet of the actuator housing.

3. The exhaust flap device as recited in claim 2, further comprising a partition wall arranged between the first coolant inlet of the flap housing and the first coolant outlet of the flap housing.

4. The exhaust flap device as recited in claim 1, further comprising a flange connection, wherein the actuator housing is fastened to the flap housing via the flange connection.

5. The exhaust flap device as recited in claim 1, wherein the coolant duct in the flap housing comprises flow guiding walls configured to force guide a coolant.

6. The exhaust flap device as recited in claim 5, wherein the flow guiding walls are arranged relative to each other in an axial direction of the flap housing so that a flow of the coolant is force guided along a circumference of the flap housing in alternating directions parallel with an axis of the exhaust gas duct.

7. The exhaust flap device as recited in claim 1, wherein the actuator further comprises an electronic control unit which comprises a rear wall, wherein the actuator coolant duct extends along the rear wall of the electronic control unit so as to at least partially surround the electric motor.

8. The exhaust flap device as recited in claim 1, wherein the coolant duct is configured to spiral in the flap housing.

9. The exhaust flap device as recited in claim 1, further comprising a heat exchanger housing comprising a heat exchanger housing coolant duct, wherein the coolant duct in the flap housing is in a direct fluid communication with the heat exchanger housing coolant duct.

10. The exhaust flap device as recited in claim 9, wherein, the flap housing further comprises a second coolant inlet and a second coolant outlet,
    the heat exchanger housing further comprises a heat exchanger coolant outlet and a heat exchanger coolant inlet, the second coolant inlet of the flap housing is connected with the heat exchanger coolant outlet of the heat exchanger housing, and the heat exchanger coolant inlet of the heat exchanger housing is connected with the second coolant outlet of the flap housing.

11. The exhaust flap device as recited in claim 10, further comprising a partition wall, the partition wall being arranged between the second coolant inlet of the flap housing and the second coolant outlet of the flap housing.

12. The exhaust flap device as recited in claim 9, further comprising a flange connection, wherein the flap housing is fastened to the heat exchanger housing via the flange connection.

* * * * *